United States Patent [19]
Kosbab

[11] Patent Number: 5,917,808
[45] Date of Patent: Jun. 29, 1999

[54] METHOD OF IDENTIFYING DEVICE TYPES ON A LOCAL AREA NETWORK USING PASSIVE MONITORING

[75] Inventor: Bruce James Kosbab, Colorado Springs, Colo.

[73] Assignee: Fluke Corporation, Everett, Wash.

[21] Appl. No.: 08/785,314

[22] Filed: Jan. 17, 1997

[51] Int. Cl.$^6$ .................................................. H04L 12/28
[52] U.S. Cl. ............................................ 370/254; 370/245
[58] Field of Search ................................... 370/242, 245, 370/254, 256; 371/20.1; 395/200.71

[56] References Cited

U.S. PATENT DOCUMENTS

| | | | |
|---|---|---|---|
| 5,097,469 | 3/1992 | Douglas | 371/20.1 |
| 5,450,408 | 9/1995 | Phaal | 370/256 |
| 5,684,796 | 11/1997 | Abidi et al. | 370/389 |
| 5,712,981 | 1/1998 | McKee et al. | 395/200.71 |
| 5,724,510 | 3/1998 | Arndt et al. | 395/200.5 |

OTHER PUBLICATIONS

Fluke Corporation, "680/682/685 Enterprise LANMeter Users Manual", Oct., 1995, pp. 8–1 to 8–16, Fluke Corporation, Everett, WA, USA.

*Primary Examiner*—Zarni Maung
*Assistant Examiner*—David M. Ovedovitz

[57] ABSTRACT

In a test instrument for testing local area networks (LANs), a method for identifying network device types on a LAN operating according to the TCP/IP protocol suite using passive monitoring is provided. A test instrument is coupled to the LAN to passively receive traffic in the form of frames that are being sent between the nodes on the LAN. The frames being sent may contain information that may be uniquely associated with specific types of network devices such as servers, routers, printers. A frame processor collects and extracts the frame information from the frames, including the message type and source IP address. The frame information is compared against sets of frame types, with each set of frame types uniquely associated with one of the network device types. The device types as detected are added to a station database.

17 Claims, 6 Drawing Sheets

METHOD OF IDENTIFYING DEVICE TYPES ON A LOCAL AREA NETWORK USING PASSIVE MONITORING

BACKGROUND OF THE INVENTION

This invention relates generally to local area network test instruments and in particular to a method for identifying the types of devices present on a local area network by passively monitoring network traffic.

Increasingly complex LANs, or simply "networks", now connect more and more types of devices including personal computers, work stations, file servers, and printers. Network hubs are often the central devices in a network through which information flows. Each client device connects to the LAN via adapters called network interface cards (NICs) to form nodes. Connecting the nodes to the hubs are network links which may consist of unshielded twisted pair (UTP) wire, coaxial cable, or fiber optic cable.

The physical layer of the network protocol is the hardware that connects the network devices and includes Ethernet which is defined according to the EEE 802.3 standard, FDDI (Fiber Distribution Data Interface), Token Ring which is defined according to the IEEE 802.5 standard, and ATM (Asynchronous Transfer Mode). Ethernet is most commonly implemented in the physical layer as twisted-wire pairs according to the 10BASE-T standard which has a speed of 10 megabits per second and uses a media access protocol called carrier-sensing multiple access with collision detection (CSMA/CD) to control information traffic flow and resolve collisions between nodes. A node can send information on the network only if no other node is currently sending information. If a node tries to send information at the same time as another node, a collision occurs and each node operates according to a well-defined "back off" procedure to resolve the collision. Each node will wait a random period of time to attempt to send the information again.

Because Ethernet is typically implemented in a baseband, broadcast network, every node receives the information sent by every other node within the collision domain. In order to minimize the burden on the software operating in host personal computers (PC's) connected to the network, a hardware layer with a hardware or media access control (MAC) address passes along to the software layer only the information appropriate for that node. Such information may be in the form of a "broadcast" message intended for all nodes in the network or as a message only for the intended node with the MAC address.

Information sent over an Ethernet network is in the form of discrete packets defined according to the seven layer Open Systems Interconnection (OSI) standard maintained by the American National Standards Institute (ANSI). OSI is a layered structure in which the highest layers take advantage of the capabilities of the lower layers to send information between nodes. Information is passed between nodes in the form of discrete packets or frames containing data or control information supplied by the various OSI layers. The highest layers are the Application layer, the Presentation layer, and the Session layer which may include Telnet, File Transfer Protocol (FTP), Simple Mail Transfer Protocol (SNMP), and Domain Name System (DNS).

The Transport layer typically includes the Transmission Control Protocol (TCP) along with the User Datagram Protocol (UDP), among others, which provide for the delivery of the data to a desired device and the division of the information into discrete packets for sending. Received packets are reassembled in a like manner. The Network layer routes messages back and forth between a source node and a destination node according to Internet Protocol (IP) addresses by adding an IP header to each packet indicating the source and destination IP addresses. The lowest layer is the physical link layer in which the hardware MAC addresses are used. The majority of networks operate according to a combination of TCP at the transport layer and IP at the network layer which is commonly referred to as a TCP/IP network. A more complete explanation of the operation of LANs according to the TCP/IP protocol suite may be found in COMER, DOUGLAS E., Internetworking With TCP/IP Volume 1: Principles, Protocols, and Architecture, Third Edition, 1995, Prentice-Hall, Englewood Cliffs, N.J.

Networks may implement more than one protocol at the same time. IP packets, also called IP datagrams, may be mixed with IPX packets, which are created by network devices running the IPX network protocol which is part of Novell NetWare from Novell, Inc. Novell IPX provides the network layer functions of addressing routing to facilitate communications between a network client and a NetWare server.

Test instruments for LANs are often utilized to determine the number and types of devices that are present in the LAN for purposes of maintenance and troubleshooting. Prior art test instruments have accomplished this task by communicating with devices on the LAN in an active IP mode, typically by issuing a series of network broadcasts. Active IP mode, in which the test instrument actively communicates with other devices on the LAN, requires that the test instrument have its own unique MAC and IP addresses in the manner of any other network device in order to properly establish communications. The IP address for the test instrument must be chosen to conform to the IP address of the LAN in order to communicate properly as a local device. At the same time, the IP address chosen must be one not used by other devices on the LAN to avioid problems induced by duplicate IP addresses.

The Fluke 67x/68x Series of LANMeters may be used to determine the various devices on the LAN according to a two step process. First, an appropriate IP address is selected for the test instrument in a test called "IP Auto Config" in which the network address and subnet address are determined and duplicate IP addresses are avoided during the address selection process. Second, MAC and IP addresses of the various devices are discovered and the devices communicated with through a series of network broadcasts in active IP mode in order to determine their device types in a test called "Segment Discovery."

The test instrument, like other network devices, is normally assigned a unique MAC address in the manner of a serial number when the test instrument is manufactured. The IP address of the test instrument, on the other hand, must be carefully selected by the user of the test instrument for each test situation in order to be appropriate for the particular LAN being tested using active IP mode. If the IP address duplicates the IP address of a device already connected to the LAN, the operation of the LAN may be disrupted. Selecting a proper IP address that operates to establish communications with the devices on the LAN without disrupting operation of the LAN is thus a critical step which may be time consuming and prone to errors. Therefore, it would be desirable to provide a method for determining types of devices on a LAN using passive monitoring with no need to select an IP address for the test instrument.

SUMMARY OF THE INVENTION

In accordance with the present invention, a method for identifying network device types on a LAN operating according to the TCP/IP protocol suite using passive monitoring is provided. A test instrument is coupled to the LAN to receive traffic in the form of frames that are being sent between the nodes on the LAN using passive IP mode. Passive IP mode allows for frames to be received without having to select an IP address. The frames being sent may contain information that may be uniquely associated with specific types of network devices such as servers, routers, printers. For example, frames containing router information protocol (RIP) messages may be assumed to be generated by one or more routers. The frame information also contains the network address and hardware address of the node sending the frame. Frame information from a network address not yet in the station database is selectively added to a station data base as it arrives as a new entry.

A frame processor collects and extracts the frame information from the frames, including the message type and source IP address in passive IP mode. The frame information is then received and processed by a microprocessor. The frame information, as it arrives, is compared against sets of frame types, with each set of frame types uniquely associated with one of the network device types. Frames containing RIP messages, for example, may thus be used to enter the device type as router in the station database for each entry associated with the network address.

The station data base contains entries for each possible station that is detected on the LAN from the frame information. New entries are added to the station database for each unique network address detected. Each entry contains fields for the network address, hardware (or MAC) address, device name, frame counts, error counts, and type of node (server, router, printer, or station). The default type of node as entered in the station database is a station.

Using passive monitoring according to passive IP mode to collect frame information to build a station database, the test instrument may be connected to the LAN with no need to select an IP address for the test instrument and determine device types through a series of network broadcasts. The contents of the station database may be displayed graphically or numerically to the user as the frame information is collected.

One object of the present invention is to provide a method for determining types of devices on a LAN.

Another object of the present invention is to provide a method for determining types of devices on a LAN by passively monitoring network traffic.

An additional object of the present invention is to provide a test instrument for determining types of devices on a LAN by passively monitoring traffic.

Other features, attainments, and advantages will become apparent to those skilled in the art upon a reading of the following description when taken in conjunction with the accompanying drawings.

DETAILED DESCRIPTION OF THE INVENTION

Figure 1:
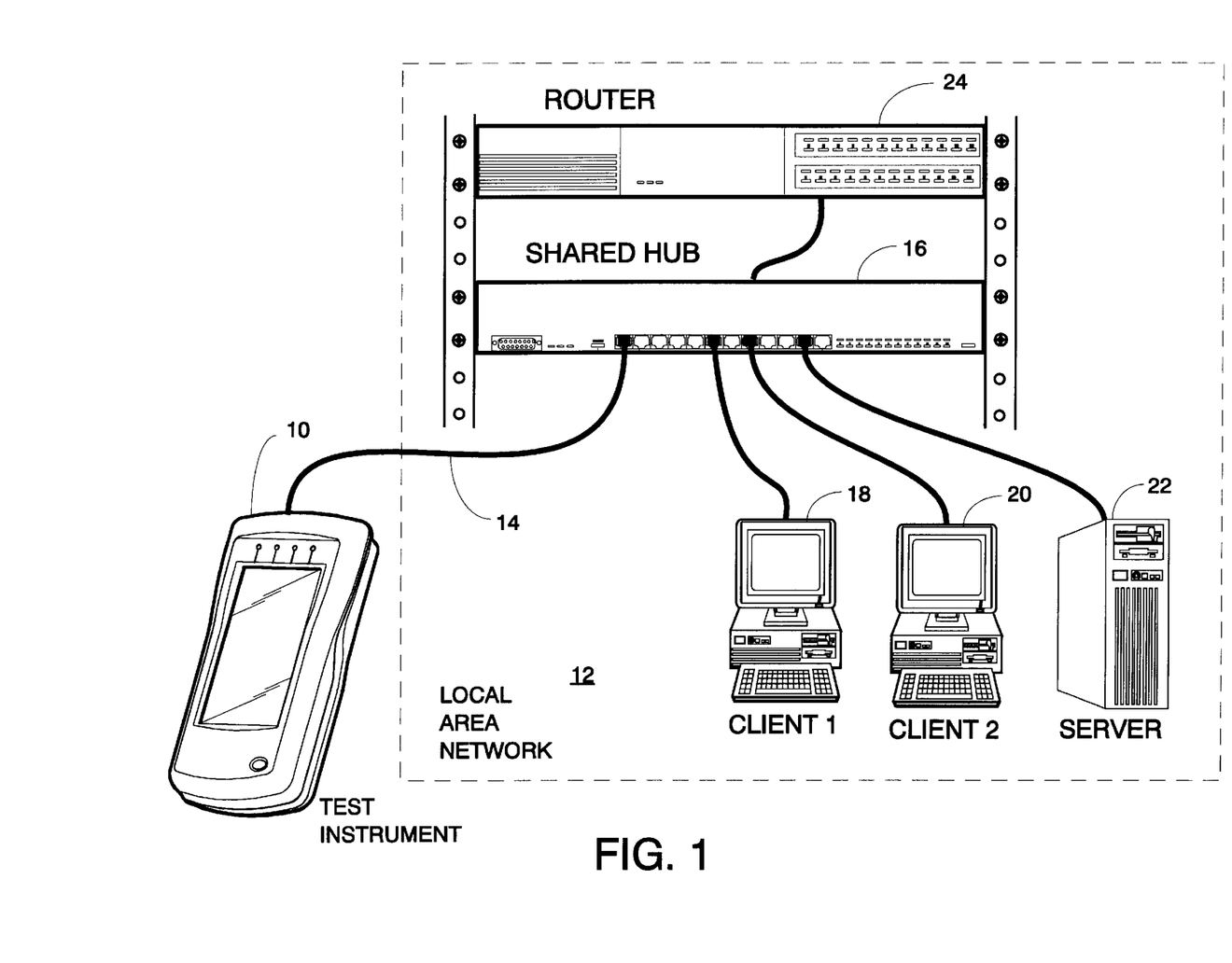
FIG. 1 is a simplified view (not to scale) of a test instrument as applied to testing a local area network (LAN)

In FIG. 1, there is shown a test instrument 10 having a graphical user interface as applied to test a local area network (LAN) 12 via a patch cord 14. The test instrument 10 is designed to be handheld, portable, and battery-operated. In testing the LAN 12, it is desirable that the test instrument 10 be coupled to the LAN 12, passively monitor the network traffic occurring within the LAN 12, and determine the types of devices on the LAN 12 without having to select a network address for the test instrument 10.

As shown, the LAN 12 is an example of the types of LANs that may be encountered by the test instrument 10 which is typically used for service and maintenance of the LAN 12. A shared hub 16 is coupled to devices 18, 20, and 22, labeled CLIENT 1, CLIENT 2, and SERVER, respectively, as well as a router 22, which collectively form the LAN 12. The LAN 12 is typically implemented using the Ethernet media access control protocol which provides for a baseband network in which the various network devices communicate with each other using data formatted as frames. The test instrument 10 may be readily adapted with the appropriate network interface hardware to accommodate different types of networks such as Fiber Distribution Data Interface (FDDI) or token ring, which also involve sending packets between network devices.

Figure 2:
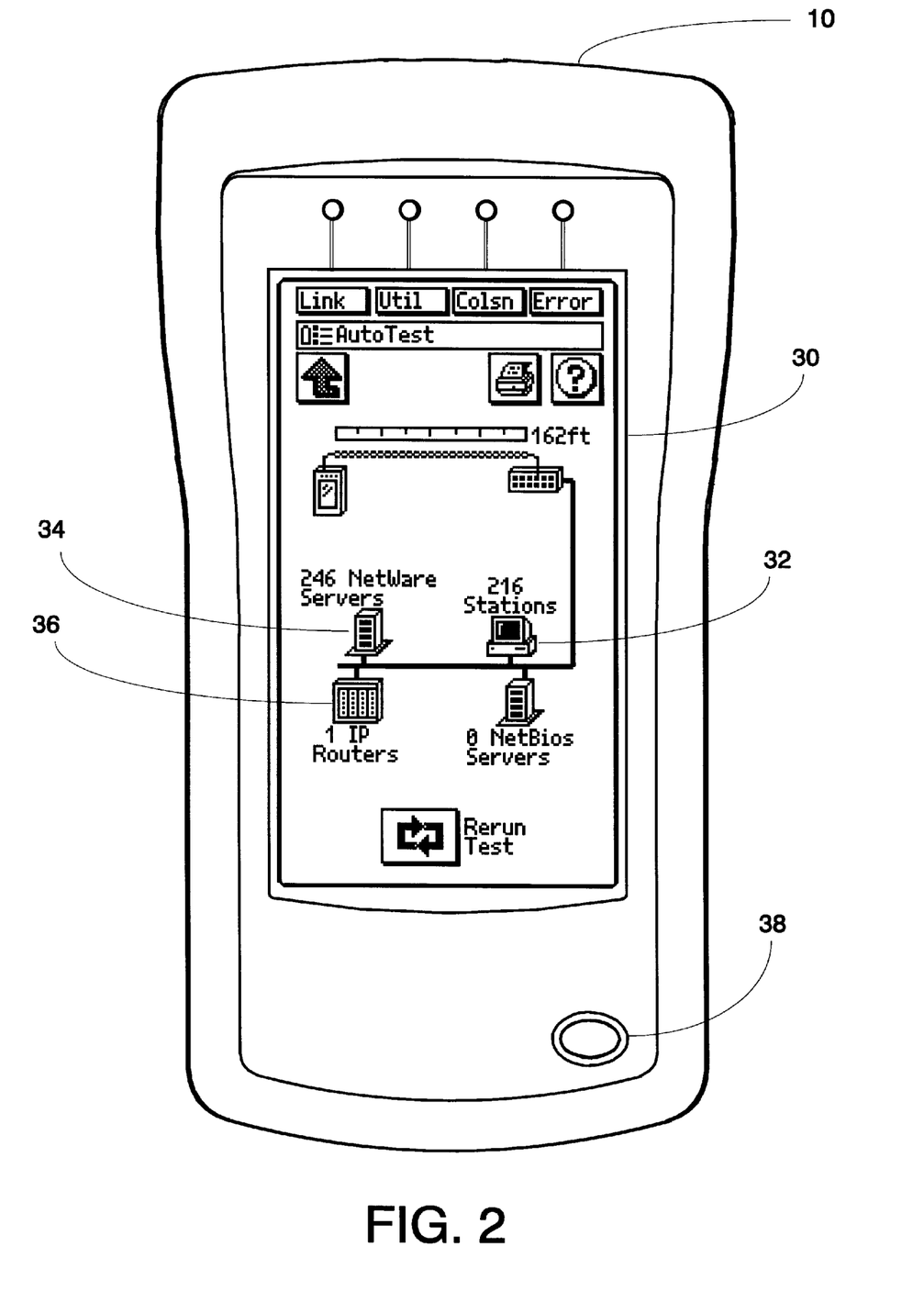
FIG. 2 is a top view of the test instrument of FIG. 1 showing a graphical user interface for displaying device types identified on the LAN.

FIG. 2 is a top view of the test instrument 10. A graphical interface 30 and a power on-off switch 38 are mounted on a top surface of the test instrument 10. The graphical interface 30 is implemented in the preferred embodiment as a dot-matrix liquid crystal display (LCD) with touchscreen capability to allow for user control. The test instrument 10 must be capable of displaying the information about the types of devices collected in a manner readily understandable by the test instrument user, either with alphanumeric characters or with graphical icons. As shown, a graphical icon 32 which resembles a personal computer corresponding to a station, a graphical icon 34 which resembles a server, and a graphical icon 36 which resembles a router, are drawn on the graphical display 30. Other display technologies using commercially available components may be readily substituted for the dot-matrix LCD that is illustrated. Other methods of representing the network devices on the graphical interface 30 may be readily substituted for the graphical icons 32, 34, and 36.

Figure 3:
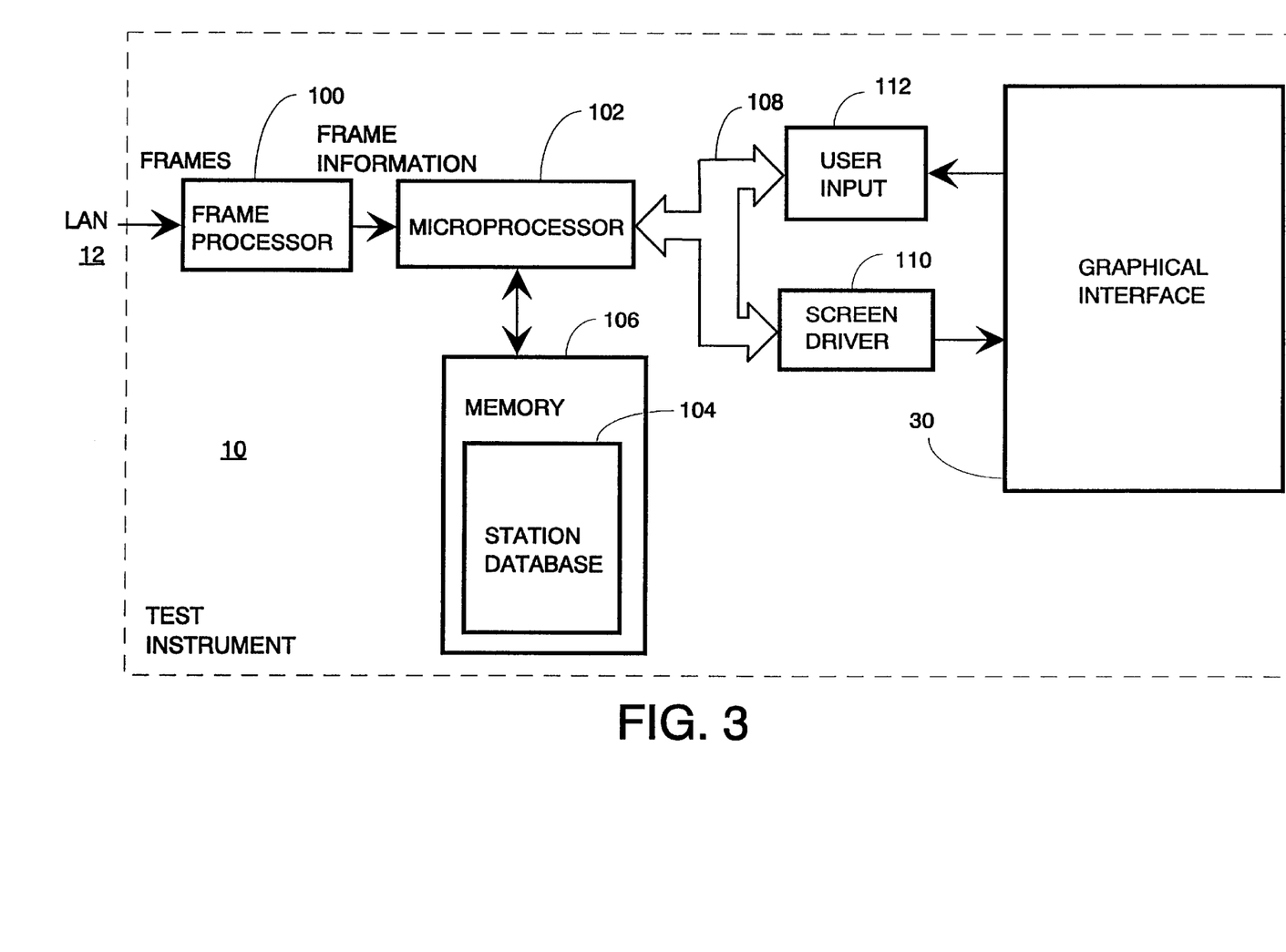
FIG. 3 is a simplified block diagram of the test instrument of FIG. 1.

FIG. 3 is a simplified block diagram of the test instrument 10 (shown in FIG. 1). The test instrument 10 is coupled to the LAN 12 to receive network traffic in the form of frames. The frames, which are commonly known as IP datagrams on a network using the TCP/IP protocol, are received by a frame processor 100 which generates frame information from the contents of the frame, including network address of the source network device, the hardware address of the source network device, the device name, and the type of frame. The frame processor 100 may be implemented in hardware, software, or a combination thereof within the test instrument 10.

The frame information is received by a microprocessor 102 for further processing and to store accumulated information about network device types in a station database 104 which resides in a memory 106. The accumulated information may then be placed on the graphical interface 30 (shown in FIG. 2) via a data bus 108 and a screen driver 110. User input, such as to initiate the process of determining the device types, may be received from the graphical interface 30 via a user input processor 112 which is implemented with touchscreen interface technology in the preferred embodiment.

Figure 4:
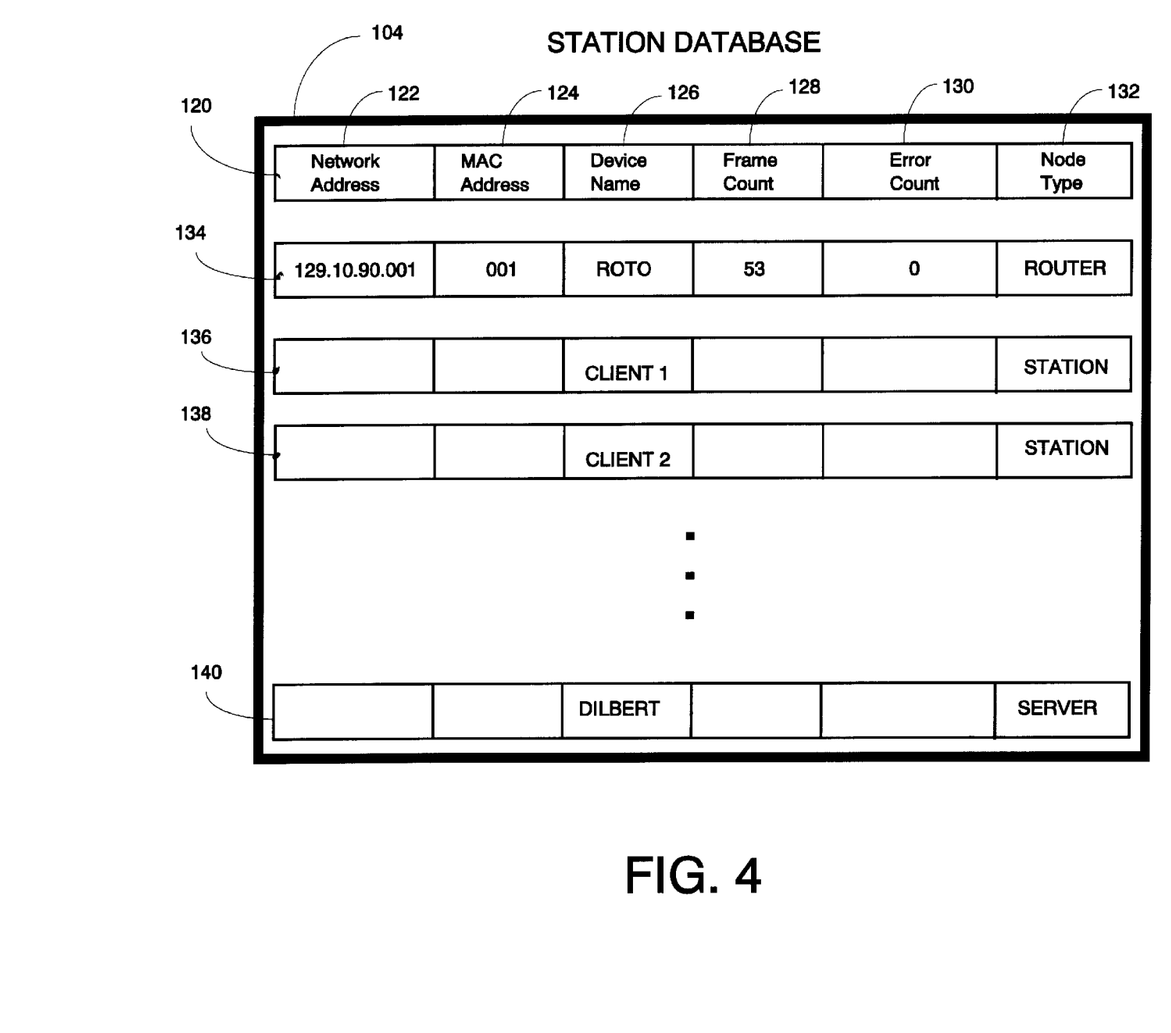
FIG. 4 is a pictorial representation of a station database as implemented in memory in the test instrument of FIG. 1.

FIG. 4 is a pictorial representation of the station database 104 (shown in FIG. 3). The station database is implemented in the memory 106 as a conventional database having entries, with each entry having fields for containing selected types of information provided by the microprocessor 102. An entry 120 is shown with fields defined according to the preferred embodiment for storing information gathered from the network devices.

Within the entry 120 are fields 122–132. The field 122 contains the network address, or IP address, of the network device sending the frame. The field 124 contains the MAC address, or hardware address, of the network device sending the frame. The field 126 contains the high-level device name. The field 128 contains the frame count, the number of frames that have been received from the network device sending the frames. The field 130 contains the error count, the number of times that errors have been detected in the frames that have been received from the network device sending the frames. The field 132 contains the node type, which is determined according to the method of the present invention.

As frames are received and processed by the frame processor 100, the network address is compared against the other network addresses already stored in the station database 104. If there are no matches in the station database, a new entry is created. For example, an entry 134 also having the fields 122–132, shown as an example for the router 24 (shown in FIG. 1) which is named "Roto", is created for the network address just received. The network address along with the associated MAC address and device name are stored in the fields 122, 124, and 126 respectively. As additional frames and errors are detected from the router 24, the frame count and error count in the fields 128 and 130 respectively, are incremented. Initially, the node type in the field 132 of the entry 134 may not be known and will typically be set to a default node type, such as "station". The set of network device types includes station, router, server, and printer. Other network device types may be readily added to the set according to the currently available network device types and the need of the user to detect such network device types.

The frames received from the router 24 and other devices on the LAN, including the devices 18, 20, and 22 (shown in FIG. 1) may be unique to one of the set of network device types, including routers, printers, and servers. As frames continue to be received from the router 24, the frame information is compared against a set of router frame types which are unique to routers, further compared to a set of server frame types which are unique to servers, and then compared to a set of printer frame types which are unique to printers. If there is a match to one of the set of device types, the node type of the field 132 of the entry 134 is filled in with the corresponding network device type.

According to the above example, the router 134 may send a "multicast router information protocol (RIP) reply" which is understood to be unique to routers. The frame information is matched against a corresponding frame type for routers and the device type is entered as "router" in the field 132 of the entry 134. In the same way, the device 22 having an entry 140, which is a file server named "Dilbert" in this example, may be detected when it sends a frame that matches the set of server frame types. The device type "server" is then placed in the field 132 in the entry 140. Because the devices 18 and 20 which have entries 136 and 138 are clients named "Client 1" and "Client 2" respectively, none of their frame types should match those unique to routers, servers, or printers. It is proper that the entries 136 and 138 corresponding to the devices 18 and 20 have their node type in the field 132 remain as "stations" in the station database 104.

The router 24 (shown in FIG. 1) may also be a statically-configured router (static router) which is commonly understood to route network traffic but without affirmatively advertising its presence on the LAN 12. Static routers present a special problem for the test instrument 10 because static routers do not broadcast routing protocols, such as RIP, to share routing information with other routers. Thus, the static router will not generate any of the frame types present in the set of router frame types.

In performing the routing function, the static router, in common with other types of routers, selectively routes frames from network devices con remote networks to the devices on the local network according to a router table. The frames thus relayed have the network address of the remote device along with the MAC address of the router, a property well known in routers. As further frames from network traffic is collected, multiple entries having different network addresses but sharing the same MAC address will appear in the station database 104. If at least four such entries appear, these entries may then be associated with the network device type "route." This is because other network device types such as servers may occasionally have multiple network addresses for one MAC address but will seldom have over two network addresses.

The actual network address among the multiple network addresses collected for the static router is the only entry having a local network address rather than a remote network address. Local addresses are determined by further monitoring of network traffic to determine which frames are uniquely local. For example the ARP (Address Resolution Protocol) request is, according to industry-standard definition, not forwarded by routers and thus contains a network address of a sending network device that is local. Using this local network address for comparison, the local address corresponding to the router may be determined. The present invention thus detects the presence of the static router using an alternative method of using the pattern of stored information within the station database 104 to detect unique patterns associated exclusively with routers.

Figure 5A:
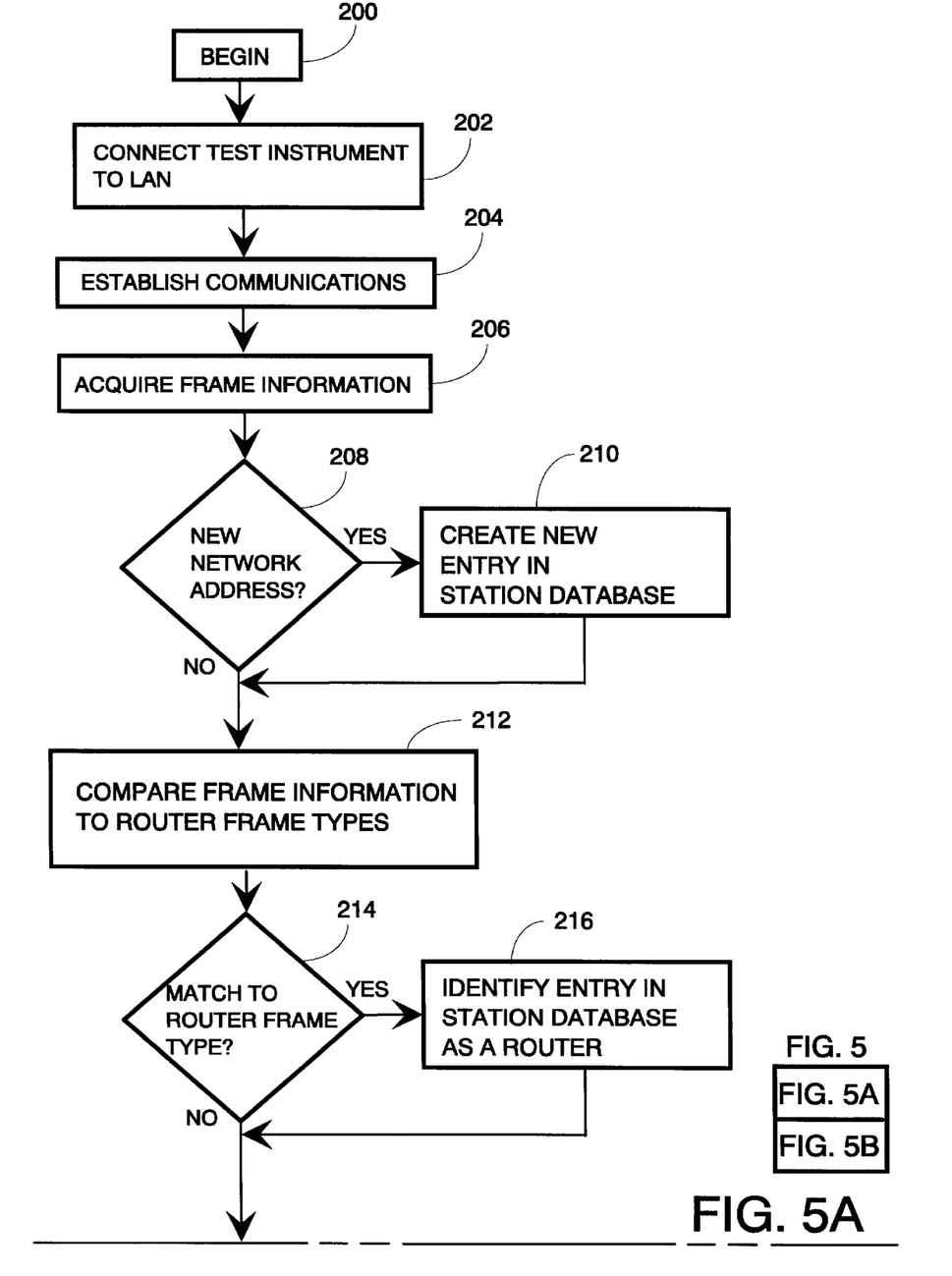
FIGS. 5A and 5B collectively comprise a flow diagram of a method of determining types of devices on the LAN according to the present invention.
Figure 5B:
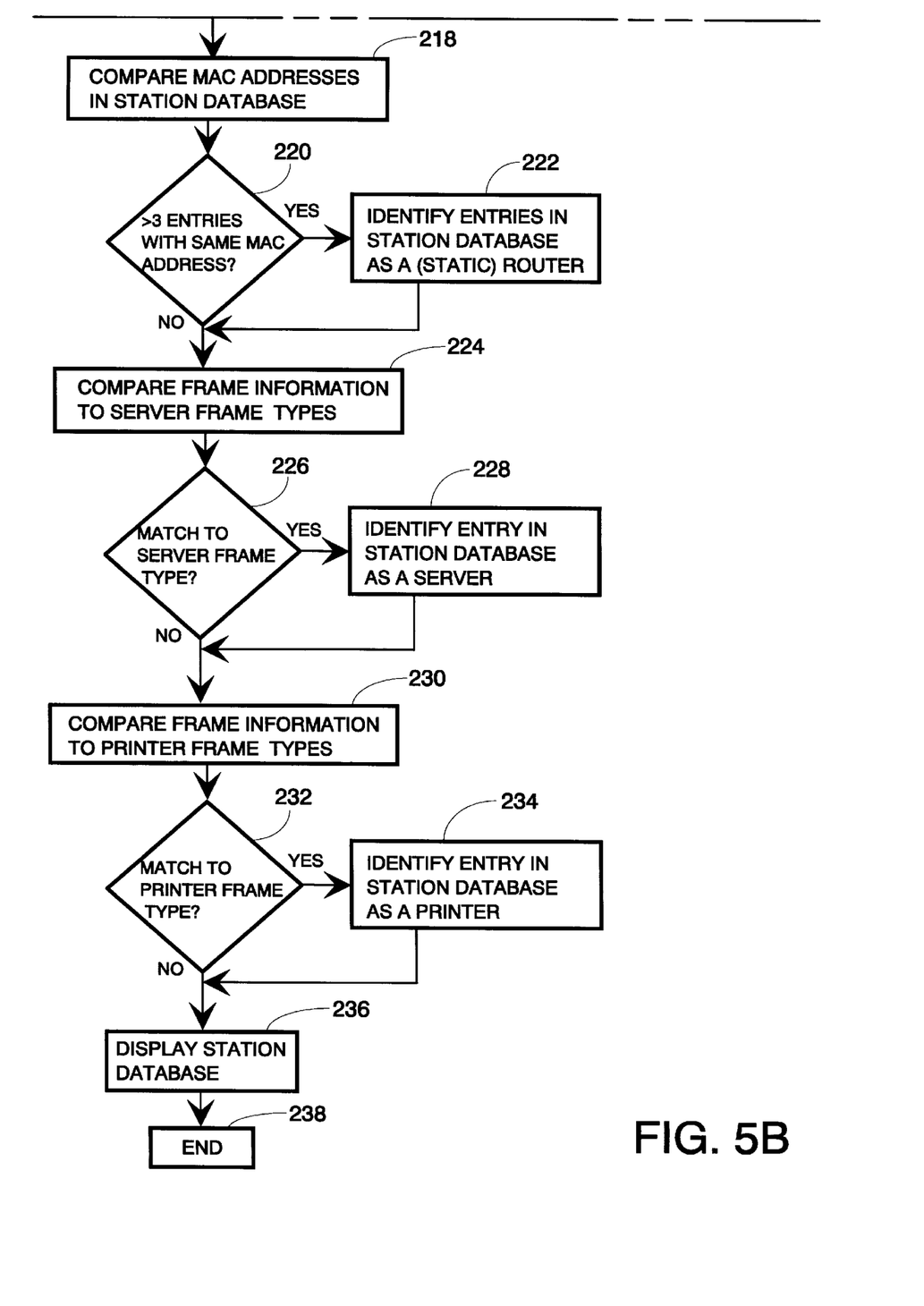

FIGS. 5A and 5B, collectively FIG. 5, comprise a flow diagram of the method of determining types of devices on the LAN according to the present invention. In FIG. 5A, the frames received from the LAN are processed in the frame processor 100 to extract the frame information. New entries are added to the station database 104 for each new station received according to the network address. Each frame is compared against a set of router frame types, and, if there is a match, the appropriate entry is tagged as a router. In FIG. 5B, static routers are detected and tagged. Each frame is compared against a set of server frame types, and if there is a match, the appropriate entry is tagged as a server. Each frame is further compared against a set of printer frame types, and, if there is a match, the appropriate entry is tagged as a printer. The contents of the station database 104 may then be displayed to the user, typically on a continual basis as new frame information continues to arrive and is added to the station database 104.

In FIG. 5A, in step 200 labeled BEGIN, the method of determining device types according to the present invention begins. At this point, the station database 104 is empty and no frames are being received yet.

In step 202 labeled CONNECT TEST INSTRUMENT TO LAN, the test instrument 10 is coupled to the LAN 12 via the patch cord 14. The test instrument 10 may be in a user area or in a telecommunications closet where the router 24 and shared hub 16 are typically located.

In step 204 labeled ESTABLISH COMMUNICATIONS, the test instrument 10 must establish communications in the conventional manner of an Ethernet device by acquiring the link pulse from the shared hub 16 before the shared hub 16 will relay frames from the other network devices. The LAN 12 may be running Ethernet, commonly known as 10BASE-T or Fast Ethernet, commonly known as 100BASE-T, and the test instrument 10 configures itself for the proper speed and protocol.

In step 206 labeled ACQUIRE FRAME INFORMATION, the test instrument 10 begins to acquire frames from the network. The frame acquisition process of step 206 continues to acquire frames over a period of time desired by the user of the test instrument 10. The collected frame information from the frame processor 100 is received by the microprocessor 102 and selectively placed in the station database 104.

In step 208 labeled NEW NETWORK ADDRESS?, a decision is made whether a particular frame is from a network device not currently in the station database 104. New network addresses will cause corresponding new entries to be added in a step 210 labeled CREATE NEW ENTRY IN STATION DATABASE. The fields 122–132 (shown in FIG. 4) for the existing and new entries are filled in as the frame information becomes available. In this way, frame information is selectively stored in the station database 104 in the steps 208 and 210 that is new and not merely duplicative.

In step 212 labeled COMPARE FRAME INFORMATION TO ROUTER FRAME TYPES, the frame type which is contained in the frame information is compared with the set of router frame types. The set of router frame types in the preferred embodiment of the present invention comprises:

TCP/IP multicast RIP (Routing Information Protocol) reply

TCP/IP multicast IGRP (Interior Gateway Routing Protocol from Cisco Systems, Inc.)

TCP/IP multicast EIGRP (Enhanced Interior Gateway Routing Protocol from Cisco Systems, Inc.)

TCP/IP multicast OSPF (Open Shortest Path First) hello routing protocol

TCP/IP ICMP (Internet Control Message Protocol) router advertisement packet

TCP/IP ICMP redirect packet

TCP/IP ICMP time exceeded packet

IPX SAP (Service Advertising Protocol) Nearest Service Reply with hop count not equal to 1

IPX RIP reply

The set of router frame types may be readily modified and expanded as network standards evolve and new devices and command structures are added.

In step 214 labeled, MATCH TO ROUTER FRAME TYPE?, if there is a match between the frame information and any of the router frame types in the above set, the corresponding entry is tagged as a router in the field 132 in a step 216 labeled IDENTIFY ENTRY IN STATION DATABASE AS A ROUTER.

Referring now to FIG. 5B, in step 218 labeled COMPARE MAC ADDRESSES IN STATION DATABASE, static routers which do not actively advertise their presence may be detected by finding at least four separate entries in the station database 104 having the same MAC address but different network addresses. In step 220 labeled >3 ENTRIES WITH SAME MAC ADDRESS?, if at least four entries are found, a static router is detected and the entries may be associated with a router in step 222 labeled IDENTIFY ENTRIES IN STATION DATABASE AS A ROUTER. Because the IP addresses of these entries may be from network devices from a remote segment, further monitoring of the network traffic may be required to acquire the IP address of the actual router which is a local network address. Once the actual IP address of the static router has been determined, the entry corresponding to the local address is tagged as the router in the field 132 and the associated entries having remote network addresses that represent traffic routed from the remote devices may be discarded because this information is not generally useful to the user of the test instrument, who desires to see only the local network devices.

In step 224 labeled COMPARE FRAME INFORMATION TO SERVER FRAME TYPES, the frame type which is contained in the frame information is compared with the set of server frame types. The set of server frame types in the preferred embodiment of the present invention comprises:

TCP/IP BOOTP (Boot Protocol) reply

TCP/IP DNS (Dynamic Name Server) reply

TCP/IP WINS (Windows Internet Naming System) reply

TCP/IP DHCP (Dynamic Host Configuration Protocol) reply

IPX SAP (Service Advertising Protocol) Nearest Service Reply with hop count equal to 1

IPX packet with a source node address of 00-00-00-00-00-01

NetBIOS Status Response indicating the station is a domain controller

The set of server frame types may be readily modified and expanded as network standards evolve and new devices and command structures are added.

In step 226 labeled MATCH TO SERVER FRAME TFYPE?, if there is a match between the frame information and any of the server frame types in the above set, the corresponding entry is tagged as a server in the field 132 in a step 228 labeled IDENTIFY ENTRY IN STATION DATABASE AS A ROUTER.

In step 230 labeled COMPARE FRAME INFORMATION TO PRINTER FRAME TYPES, the frame type which is contained in the frame information is compared with the set of printer frame types. The set of printer frame types in the preferred embodiment of the present invention comprises:

IPX SAP General Service Reply with any of the following service types:

0x030c

0x0047

0x0527

The set of printer frame types may be readily modified and expanded as network standards evolve and new devices and command structures are added.

In step 232 labeled MATCH TO SERVER FRAME TYPE?, if there is a match between the frame information and any of the server frame types in the above set, the corresponding entry is tagged as a server in the field 132 in the step 234 labeled IDENTIFY ENTRY IN STATION DATABASE AS A PRINTER.

In step 236 labeled DISPLAY STATION DATABASE, the contents of the station database 104 may be displayed in graphical or alphanumeric format via the graphical interface 30. The step 236 may be called to display the contents of the station database 104 on a continual basis as it is updated with new frame information or only as requested.

In step 238 labeled END, the method of determining types of devices on the LAN may be terminated or may loop back to the step 206 to continue acquiring frame information.

It will be obvious to those having ordinary skill in the art that many changes may be made in the details of the above described preferred embodiments of the invention without departing from the spirit of the invention in its broader aspects. For example, other network device types may be added to the set of network device types as they are adopted, along with sets of frame types uniquely associated with each network device type. Furthermore, existing network device types may be identified in more detail. For example, the device type "server" may comprise NetBIOS servers, WINS servers, mail servers, web servers, and so on, all of which may have their own set of frame types allowing for further identification of the type of server. TLerefore, the scope of the present invention should be determined by the following claims.

What I claim as my invention is:

1. In a test instrument, a method for determining network device types on a LAN comprising:
    (a) coupling said test instrument to said LAN;
    (b) passively acquiring frame information from said LAN;
    (c) selectively storing said frame information in an entry in a station database;
    (d) comparing said frame information to at least one set of frame types wherein said set of frame types is associated with one of said network device types; and
    (e) if said frame information matches any of said set of frame types, identifying said entry as said network device type.

2. In a test instrument, a method for determining network device types on a LAN according to claim 1 further comprising comparing said frame information to a plurality of said sets of frame types.

3. In a test instrument, a method for determining network device types on a LAN according to claim 1 further comprising displaying the contents of said station database on a graphical interface of said test instrument.

4. In a test instrument, a method for determining network device types on a LAN according to claim 1 wherein said set of network device types comprises station, router, server, and printer.

5. In a test instrument, a method for determining network device types on a LAN according to claim 4 wherein said plurality of said set of frame types comprise a set of router frame types, a set of server frame types, and a set of printer frame types.

6. In a test instrument, a method for determining network device types on a LAN according to claim 5 wherein if said frame information matches said set of router frame types, identifying said entry as said router.

7. In a test instrument, a method for determining network device types on a LAN according to claim 5 wherein if said frame information matches said set of server frame types, identifying said entry as said server.

8. In a test instrument, a method for determining network device types on a LAN according to claim 5 wherein if said frame information matches said set of printer frame types, identifying said entry as said printer.

9. In a test instrument, a method for determining network device types on a LAN according to claim 1 wherein said frame information comprises a network address and a MAC address.

10. In a test instrument, a method for determining network device types on a LAN according to claim 9 further comprising creating a new entry in said station database for each new network address received from said frame information.

11. In a test instrument, a method for determining network device types on a LAN comprising:
    (a) coupling said test instrument to said LAN;
    (b) passively acquiring frame information from said LAN;
    (c) selectively storing said frame information in an entry in a station database;
    (d) comparing said frame information to a set of router frame types, a set of printer frame types, and a set of printer frame types;
    (e) if said frame information matches any of said set of router frame types, identifying said entry as said router;
    (f) if said frame information matches any of said set of server frame types, identifying said entry as said server; and
    (g) if said frame information matches any of said set of printer frame types, identifying said entry as said printer.

12. In a test instrument, a method for determining network device types on a LAN according to claim 11 further comprising displaying the contents of said station database on a graphical interface of said test instrument.

13. In a test instrument, a method for determining network device types on a LAN according to claim 11 wherein said LAN operates according to the TCP/IP protocol suite.

14. In a test instrument, a method for determining network device types on a LAN according to claim 11 wherein said frame information comprises a network address and a MAC address.

15. In a test instrument, a method for determining network device types on a LAN according to claim 14 further comprising creating a new entry in said station database for each new network address received from said frame information.

16. In a test instrument, a method for determining network device types on a LAN according to claim 15 further comprising detecting a static router if greater than three entries in said station database have the same MAC address.

17. An instrument for testing a local area network (LAN) comprising:
    (a) a housing, said housing sized to be held within the hand of an operator;
    (b) frame processor means, positioned in said housing, for receiving frames from said LAN and for processing said frames to provide frame information;
    (c) a patch cord means for electrically coupling said frame processor means to said LAN;
    (d) memory means for storing a station database, said memory means being positioned in said housing;
    (e) a microprocessor positioned in said housing and coupled to said memory means and to said frame processor means to receive and selectively store said frame information in said station database as an entry wherein said entry is identified as a network device type when said frame information matches one of a plurality of frame types; and
    (f) display means, mounted to said housing, for displaying the contents of said station database.

* * * * *